US008160736B2

(12) United States Patent
Krisnamuthi et al.

(10) Patent No.: US 8,160,736 B2
(45) Date of Patent: *Apr. 17, 2012

(54) METHODS AND APPARATUS FOR WHITE SPACE REDUCTION IN A PRODUCTION FACILITY

(75) Inventors: Thangappan Krisnamuthi, Johor (MY); Mohd Azizi Chik, Kedah (MY); Tin Tin Ung, Singapore (SG); Kian Wee Lim, Sarhad Ville (SG); Stephen Todd Markle, Singapore (SG)

(73) Assignee: GlobalFoundries Singapore Pte. Ltd., Singapore (SG)

( * ) Notice: Subject to any disclaimer, the term of this patent is extended or adjusted under 35 U.S.C. 154(b) by 651 days.

This patent is subject to a terminal disclaimer.

(21) Appl. No.: 12/023,037

(22) Filed: Jan. 31, 2008

(65) Prior Publication Data

US 2008/0183324 A1    Jul. 31, 2008

Related U.S. Application Data (63) Continuation-in-part of application No. 11/735,998, filed on Apr. 16, 2007, now Pat. No. 7,672,748.

(60) Provisional application No. 60/887,355, filed on Jan. 31, 2007.

(51) Int. Cl.
*G06F 19/00* (2011.01)

(52) U.S. Cl. ...................................................... 700/112

(58) Field of Classification Search ............. 700/95, 700/99–102, 112–114, 213, 224–226, 228, 700/229
See application file for complete search history.

(56) References Cited

U.S. PATENT DOCUMENTS

| | | | |
|---|---|---|---|
| 3,952,388 A | | 4/1976 | Hasegawa et al. |
| 5,980,183 A | * | 11/1999 | Fosnight ................ 414/222.01 |
| 6,122,566 A | | 9/2000 | Nguyen et al. |
| 6,134,482 A | * | 10/2000 | Iwasaki ........................ 700/121 |
| 6,351,686 B1 | * | 2/2002 | Iwasaki et al. ............... 700/228 |
| 6,411,859 B1 | * | 6/2002 | Conboy et al. ............... 700/101 |
| 6,604,012 B1 | * | 8/2003 | Cho et al. ..................... 700/121 |
| 6,687,563 B1 | * | 2/2004 | Wang et al. .................. 700/121 |
| 6,748,282 B2 | * | 6/2004 | Lin ................................. 700/95 |
| 6,766,285 B1 | * | 7/2004 | Allen et al. ..................... 703/22 |
| 6,786,404 B1 | * | 9/2004 | Bonner et al. ................ 235/385 |
| 6,853,876 B2 | | 2/2005 | Wehrung et al. |

(Continued)

FOREIGN PATENT DOCUMENTS

EP     1569262     8/2005

OTHER PUBLICATIONS

Mohd Aziz et al., Cycle Time Reduction Through Event Based Management Approach in 300mm Wafer Foundry, 3rd ISMI Symposium on Manufacturing Effectiveness, Oct. 9-11, 2006, Austin, Texas.

(Continued)

*Primary Examiner* — M. N. Von Buhr
(74) *Attorney, Agent, or Firm* — Horizon IP Pte Ltd (57) ABSTRACT

Efficient manufacturing automation system and methods are described. The automation system controls movement of materials for processing by tools in a manufacturing facility. The system and methods include pre-emptive dispatching for transferring of materials. With the pre-emptive dispatching, the next destination and next lot to be processed is determined prior to a first lot being converted to a ready to unload state. This reduces wait time or idle time to improve tool utilization.

32 Claims, 8 Drawing Sheets

U.S. PATENT DOCUMENTS

| | | | |
|---|---|---|---|
| 6,871,113 B1 | 3/2005 | Maxim et al. | |
| 6,877,944 B2 | 4/2005 | Peiter | |
| 6,931,296 B2 * | 8/2005 | Lin et al. | 700/101 |
| 6,978,187 B1 * | 12/2005 | Ryskoski | 700/100 |
| 7,065,856 B1 | 6/2006 | Lemelson | |
| 7,085,614 B1 * | 8/2006 | Gartland et al. | 700/100 |
| 7,151,980 B2 | 12/2006 | You et al. | |
| 7,206,652 B2 * | 4/2007 | Burda et al. | 700/96 |
| 7,239,930 B2 * | 7/2007 | Burda et al. | 700/100 |
| 7,257,454 B2 * | 8/2007 | Chien | 700/101 |
| 7,337,032 B1 * | 2/2008 | Nettles et al. | 700/100 |
| 7,477,958 B2 * | 1/2009 | Burda et al. | 700/102 |
| 7,522,969 B2 * | 4/2009 | Duffin et al. | 700/112 |
| 7,539,553 B2 * | 5/2009 | Chang et al. | 700/121 |
| 7,567,851 B2 * | 7/2009 | Schmidt | 700/103 |
| 7,571,020 B2 * | 8/2009 | Schmidt | 700/101 |
| 7,664,561 B1 * | 2/2010 | Chen et al. | 700/101 |
| 7,672,748 B2 * | 3/2010 | Chik et al. | 700/112 |
| 7,813,993 B1 * | 10/2010 | Barto et al. | 705/37 |
| 2003/0225474 A1 * | 12/2003 | Mata et al. | 700/121 |
| 2004/0039469 A1 | 2/2004 | Lin | |
| 2004/0073331 A1 | 4/2004 | Chang et al. | |
| 2004/0111339 A1 | 6/2004 | Wehrung et al. | |
| 2005/0096784 A1 | 5/2005 | Lai | |
| 2005/0216115 A1 | 9/2005 | You et al. | |
| 2005/0273190 A1 | 12/2005 | Duffin et al. | |
| 2006/0045662 A1 | 3/2006 | Aalund et al. | |
| 2006/0190118 A1 | 8/2006 | Teferra et al. | |
| 2007/0061034 A1 | 3/2007 | Puri et al. | |
| 2007/0100486 A1 | 5/2007 | Burda et al. | |
| 2007/0142947 A1 * | 6/2007 | Qu et al. | 700/97 |
| 2007/0276531 A1 * | 11/2007 | Teferra et al. | 700/112 |
| 2007/0276532 A1 | 11/2007 | Teferra et al. | |
| 2008/0100814 A1 * | 5/2008 | Chen et al. | 355/55 |
| 2008/0125900 A1 * | 5/2008 | Maxim et al. | 700/113 |
| 2008/0275582 A1 | 11/2008 | Nettles et al. | |

OTHER PUBLICATIONS

Uzma Syed et al.; "Anticipatory Real-Time Scheduling in Manufacturing Cell Design"; IEEE International Conference on Systems, Man and Cybernetics—Intelligent Systems for the 21st Century; Oct. 22-25, 1995; pp. 4131-4136; vol. 5; IEEE; New York, USA.

Uzma Syed et al., Anticipatory Real-Time Scheduling in Manufacturing Cell Design, Systems, Man and Cybernetics, Oct. 22-25, 1995, pp. 4131-4136, vol. 5, Canada.

\* cited by examiner

METHODS AND APPARATUS FOR WHITE SPACE REDUCTION IN A PRODUCTION FACILITY

CROSS REFERENCES TO RELATED APPLICATIONS

This application is a continuation-in-part of U.S. patent application Ser. No. 11/735,998, filed Apr. 16, 2007, now Patent No. 7,672,748, granted Mar. 2, 2010, entitled "Automated Manufacturing Systems and Methods" and this application claims the benefit of U.S. Provisional Application No. 60/887,355, filed Jan. 31, 2007, entitled "Controller for White Noise Reduction in A Production Facility".

FIELD OF THE INVENTION

The present invention relates generally to manufacturing automation systems and methods for movement of material in a production facility.

BACKGROUND OF THE INVENTION

The manufacture of a product typically involves a number of processing steps performed in the sequence. In most instances, these processing steps are carried out on more than one piece of processing equipment, each equipment having one or more processing chambers. For example, the manufacture of electronic devices in a wafer fabrication facility involves the performance of processing steps such as film deposition, photolithography, etching, heat treatment and dopant introduction with respect to a wafer substrate such as silicon. While it is possible to carry out some of the processing steps in a single processing equipment, it is generally the case that the substrate will have to be transferred between different processing equipments situated at different locations within the production facility.

Figure 1:
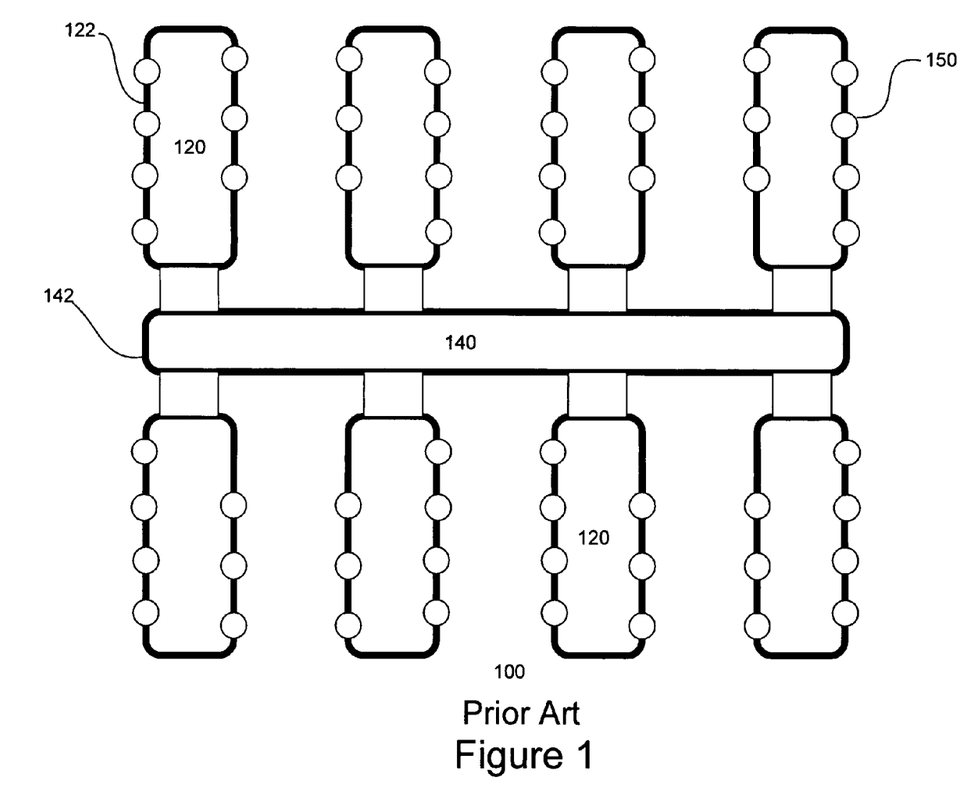
FIG. 1 shows a known layout of fabrication facility with an automated transport system.

FIG. 1 shows a known fabrication facility layout 100. The fabrication facility layout comprises a plurality of bays 120 located on opposite sides of a main bay or central isle 140. Processing equipments 150 for processing wafer substrates are arranged in a loop within a bay 120. A plurality of wafer substrates are generally grouped together and placed in a carrier such as sealed pods. The wafer substrates are then transported within the carriers between different locations in the production facility such as processing equipments 150 and storage locations. Automated transport systems such as overhead hoist transport (OHT) systems, substrate carrier handling robots, automatic or rail guided vehicles are typically employed in transporting the carriers between locations. In FIG. 1, the automated transport system comprises an OHT system including tracks 122 and 142 with a plurality of carrier transports (not shown) coupled to it. The carrier transports are adapted to transfer one or more carriers around the production facility and can take various forms such as transport vehicles that travel along the tracks 122, 142 or cradles coupled to a moving track such as a moving conveyor belt. Depending on the system, the carrier transports can be segregated into transportation that facilitate the transfer of carriers within a bay (intra-bay) versus transportation that facilitate the transfer of carriers between bays (inter-bay). Alternatively, the carrier supports can also be free to circulate freely through the fabrication facility without limitation as intra-bay or inter-bay. It is also not essential that the fabrication facility be separated into bays.

Depending upon the complexity of the electronic device, it is not uncommon for the total fabrication cycle to involve few hundred processing steps starting from a blank wafer substrate to the separation of a completed wafer into individual integrated circuits. During this time, the wafer substrates may be moved between a hundred different locations for processing, the process route possibly including a high level of reentrance in which the same processing equipment or equipment types are used. Therefore, the time taken for the transfer of wafer substrates between different locations in a fabrication facility including time spent waiting for a carrier transport to pick up the carrier within which the substrates are placed plays an important role in determining the total elapsed time for making an electronic device also known as fabrication cycle time.

In today's semiconductor industry, manufacturers are trying to improve their market share by improving wafer yield and providing shorter cycle time to attract more customers. Therefore, efficient manufacturing automation systems and methods for transferring work in progress materials such as wafer substrates in a fabrication facility are desirable.

SUMMARY OF THE INVENTION

In general, the present invention relates to manufacturing automation systems and methods for movement of material in a production facility.

In accordance with a first aspect of the invention, an automated method for movement of material in a production facility is provided where prior to an actual conversion in status of a first lot processing in a first equipment to a ready to unload state, a command is issued to determine a next location for the first lot. The ready to unload state being a state indicating that the first lot has completed processing and is ready to be unloaded from the first equipment. This allows the first lot to avoid having to wait until it reaches the ready to unload state before a command to determine its next location is issued. As a result, less time is incurred in waiting for a carrier transport to pick up the completed first lot thus facilitating a possible reduction in fabrication cycle time. Additionally, expediting the removal of a completed first lot also means that the processing equipment is ready to receive a second subsequent lot for processing at an earlier time. The idle time of a processing equipment may therefore be reduced.

In accordance with a second aspect of the invention, an automated manufacturing method further comprises the step of issuing a next destination command to determine a next destination for the first lot. The next destination of the first lot is selected and a pickup transport is dispatched to pick up the first lot from the first equipment. A next lot command is issued to determine a second subsequent lot to be processed in the first equipment. The method further includes the step of selecting the second lot to be processed in the next equipment and a delivery transport is dispatched for retrieving the second lot from an original location and the second lot is transported to the first equipment.

In another aspect of the invention, a method of manufacturing articles is presented. The method comprises processing a first article in a first tool. An anticipated conversion in status of the first article to a ready to unload state is detected and a next destination command is issued to determine the next tool destination for the first article before the first article is converted to the ready to unload state.

In yet another aspect of the invention, a computer medium for storing a computer program for manufacturing automation is provided. The computer medium comprises detecting an anticipated conversion in status of a first lot processing in a first equipment to a ready to unload state. The ready to unload state indicates that the first lot has completed processing and is ready to be unloaded from the first equipment. The computer medium further includes issuing a next destination command to determine a next destination for the first lot before the first lot is converted to the ready to unload state.

These and other objects, along with advantages and features of the present invention herein disclosed, will become apparent through reference to the following description and the accompanying drawings. Furthermore, it is understood that the features of the various embodiments described herein are not mutually exclusive and can exist in various combinations and permutations.

BRIEF DESCRIPTION OF THE DRAWINGS

In the drawings, like reference numbers generally refer to the same parts throughout the different views. Also, the drawings are not necessarily to scale, emphasis instead generally being placed upon illustrating the principles of the invention. In the following description, embodiments of the invention will now be described, by way of example with reference to the drawings of which

DESCRIPTION OF THE INVENTION

Generally, the present invention relates to manufacturing automation systems and methods for movement of material in a production facility. The materials may be one or more work in progress items grouped into individual lots.

Figure 2:
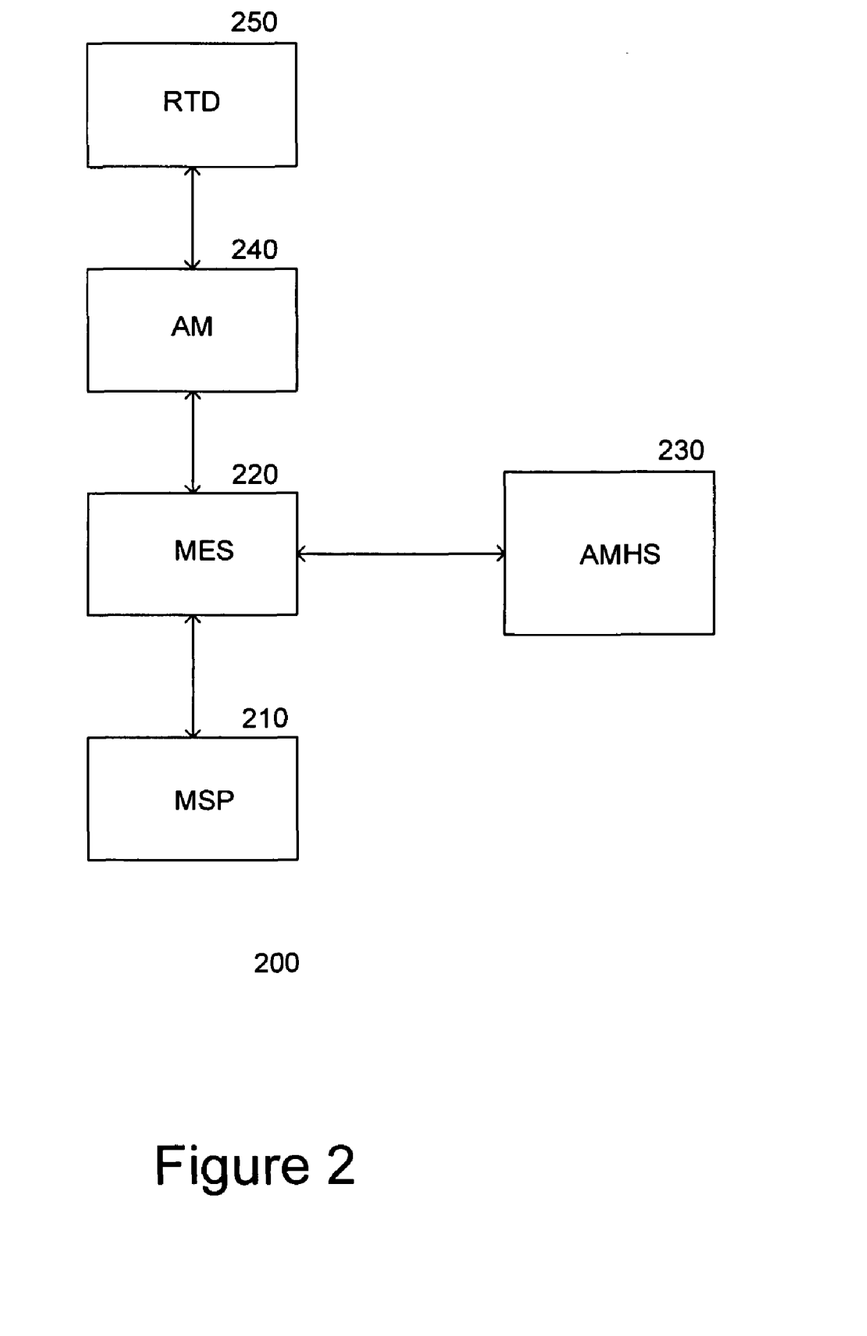
FIG. 2 shows a block diagram of a manufacturing automation system (without an auto controller) for controlling the operation of a production facility.

FIG. 2 shows a manufacturing automation system 200 which may be used for controlling the operation of a production facility. As shown in FIG. 2, the manufacturing automation system 200 comprises at least one machine supervisory program (MSP) 210 which monitors the status of and acts as an interface for communicating with the processing equipments associated with it. The MSP is in a two-way communication with a manufacturing execution system (MES) 220. The manufacturing execution system (MES) 220 tracks the overall execution or operations in the production facility. The MES may also perform functions associated with the production facility such as tracking the location of carriers and status of equipments, performing lot reservations and putting lots on hold.

Apart from the MSP 210, the MES 220 is also in two-way communication with an automated material handling system (AMHS) 230 and an activity manager (AM) 240. The automated material handling system (AMHS) 230 is a controller for controlling a transport system within the production facility. The AMHS 230 monitors and controls the operation of the transport system components such as carrier transports and other transport means associated with the transport system such as conveyor belts and carrier handling robots so that carriers can be moved to their desired locations. For example, the AMHS may allocate carrier transports to carriers for movement thereof, direct the movement of carrier transports to specific locations and track the status and location of carrier transports within the facility.

The AM is in two-way communication with a real time dispatcher (RTD) 250 for managing the lots in the facility. The RTD contains an inventory list of the lots in the facility and information concerning the lots such as lot priority and dispatching lot sequence. The RTD may provide to the AM a lot list of work in progress for an equipment including perhaps priority ranking of the lots. Based on the lot list, the AM then performs next destination and priority analysis for lots which have been processed by an equipment and ready to be removed from the equipment.

Figure 3:
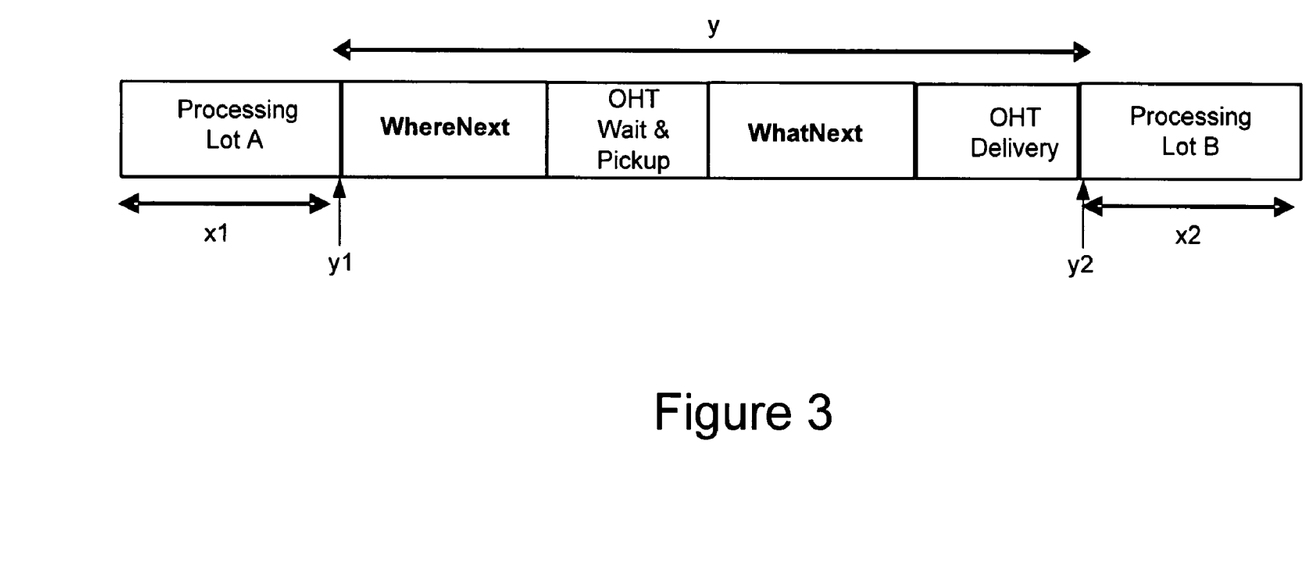
FIG. 3 shows a Gantt chart illustrating a process flow for material dispatch by the manufacturing automation system of FIG. 2 in accordance with a first embodiment of the invention.

FIG. 3 is a Gantt chart illustrating a process flow in accordance with one embodiment of the invention for material dispatch by the manufacturing automation system 200 of FIG. 2 from a machine perspective, wherein x1 in the process flow represents a duration when a first equipment is processing lot A. Lot A contains one or more items that are in the process of being transformed into a final product. In an exemplary embodiment, the items may be wafer substrates or LCD panels. Alternatively, other items are also suitable. For the case where the items are wafer substrates, the first equipment may be depositing a film on the wafer substrates in lot A. The first equipment may process all the items in lot A using the same recipe or there may be variation in recipes used between items. The end of x1 as signified by y1 in FIG. 3, lot A has completed processing and is in a ready to unload status where it is ready to be removed from the first equipment. The period x2 represents a duration when the first equipment is processing a second subsequent lot, lot B after lot A has been completed processing and is removed from the first equipment. The start of x2 is signified by y2 where loading of lot B onto the first tool for processing has completed. For example, lot B may be loaded onto a loading station such as a load port for processing. The time elapsed between y1 and y2 is equivalent to the machine idle time y. During y, the first equipment is in an idle state waiting for the completed lot A to be removed and the subsequent lot B to arrive for processing.

As shown in FIG. 3, an unload request is issued at y1 when the first equipment has finished processing lot A and the items in lot A are located in a carrier ready for removal from the first equipment. The unload request indicates that the carrier containing lot A is in a ready to unload state and triggers a "WhereNext" analysis to be performed. The "WhereNext" analysis is to determine a next destination for lot A. In one embodiment, an MSP associated with the first equipment communicates the unload request to the MES where upon receipt of the unload request, the MES initiates a "WhereNext" analysis in conjunction with the AM. When the next destination for lot A has been determined, an OHT wait and pickup transaction is initiated. In this transaction, a transportation request is issued for an OHT carrier transport to pick up lot A from the first equipment and deliver it to the next destination. The transportation request may be issued by the MES to the AMHS which is the controller for the transport system. The AMHS will then arrange for a pickup carrier transport to retrieve lot A from the first equipment.

After lot A has been removed from the first equipment, the first equipment issues a load request which is indicative of that the first equipment is requesting for a lot to process. This triggers a "WhatNext" analysis to determine a next suitable lot to be processed on the first equipment and a subsequent reservation transaction to assign the chosen next lot to the first equipment. In one embodiment, the MSP associated with the first equipment communicates the load request to the MES thereby initiating the MES to perform a "WhatNext" analysis in conjunction with the AM. After a next lot B has been chosen and reserved, an OHT Wait & Pickup transaction is initiated where a transportation request is issued for example by the MES to the AMHS for a delivery carrier transport to pickup lot B and deliver it to the first equipment. When lot B is delivered to the first equipment by the carrier transport, it loaded onto the first equipment for processing. This event is represented by "OHT delivery" in FIG. 3. At y2, loading of lot B onto the first equipment is completed and processing of lot B then proceeds as shown in FIG. 3.

In the process flow for FIG. 3, requests made by the first equipment e.g. unload and load request may be attended to either by polling or event triggering. In polling, the manufacturing execution system (MES) polls the equipments sequentially within a bay or area to determine if any of the equipment are in need of services. The polling is achieved with a "watchdog". The MES can have multiple watchdogs, with each monitoring a respective group of equipments, for example, 10. The watchdog will go and check the status of the 10 equipments to see whether an equipment requires for example, a carrier transport for carrier delivery or pickup. When a polling mechanism is employed, an equipment waits for its turn to be polled before its requests can be accepted and attended to. On the other hand, in event triggering, actions are initiated when the request is made instead of having to wait for the equipment's turn to be polled by the watchdog. As described, the dispatching regarding the next destination is initiated after the first lot has already converted to a ready to unload state and an unload request is made.

In accordance with another embodiment of the invention, pre-emptive dispatching is performed. In pre-emptive dispatching, a command to determine a next destination for a first lot processing in a first equipment is issued prior to an actual conversion of the first lot to a ready to unload state. The ready to unload state indicates that the first lot has completed processing and is ready to be unloaded from the first equipment. However, with pre-emptive dispatching, the conversion of a first lot to a ready to unload state is pro-actively anticipated and advance command is issued to determine a next destination for the first lot. Preferably, pre-emptive dispatch uses event triggering. In a preferred embodiment, a command to determine a next lot to process on the first equipment is also issued before actual conversion of the first lot to a ready to unload state. As such, pre-emptive dispatching schedules or plans in advance. This can reduce the duration of y (or idle time), advantageously increasing throughput by improving machine utilization.

Figure 4:
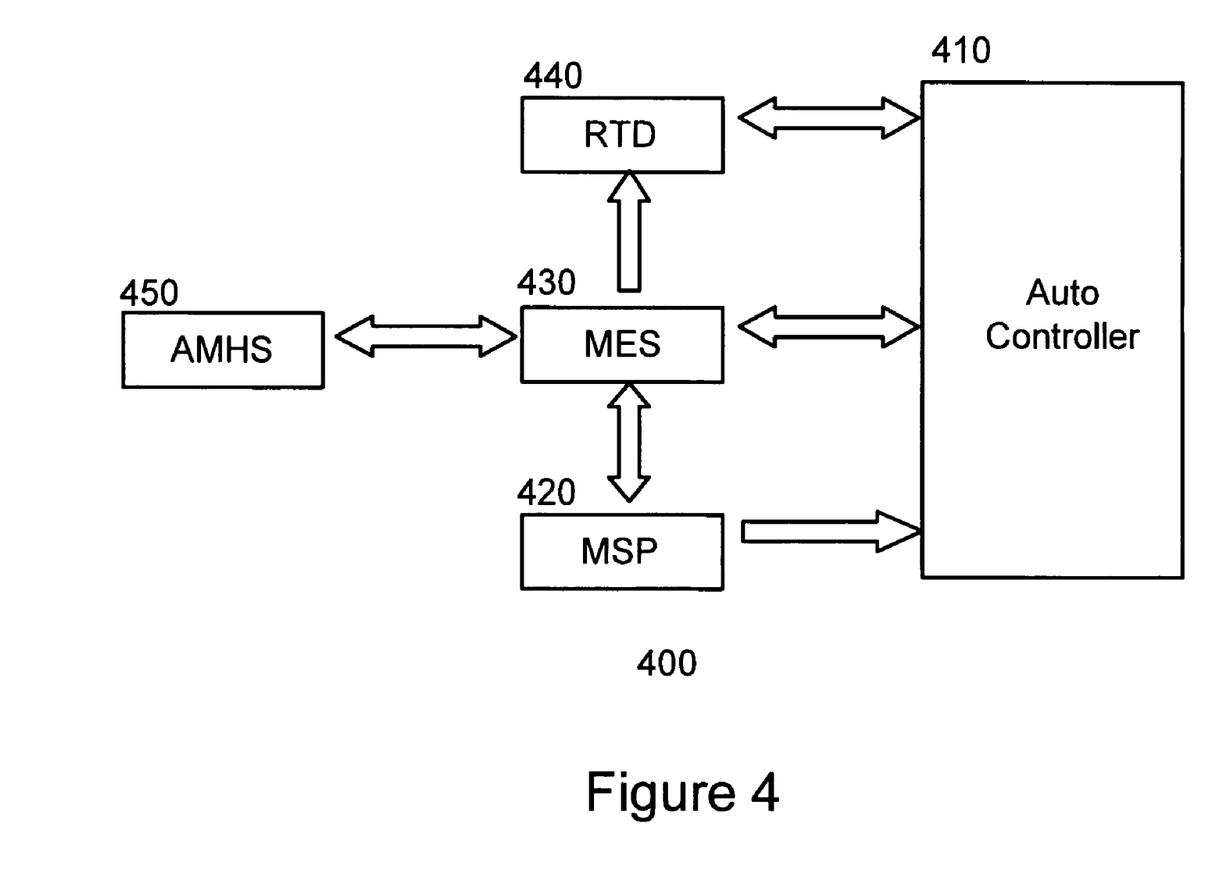
FIG. 4 shows a block diagram of an exemplary manufacturing automation system with an auto controller adapted to implement pre-emptive dispatch in accordance with a second embodiment of the invention.

FIG. 4 shows a manufacturing automation system 400 for controlling the operation of a production facility in accordance with one embodiment of the invention. The manufacturing automation system 400 comprises an auto controller 410. The manufacturing system also includes, for example, a machine supervisory program (MSP) 420, manufacturing execution system (MES) 430, real time dispatcher (RTD) 440 and an automated material handling system (AMHS) 450. In one embodiment, the functionality of the MSP 420, MES 430, RTD 440 and AMHS 450 is similar to that in FIG. 2. The MES 430 is in a two-way communication with the auto controller 410, MSP 420, and AMHS 450 and in a one-way communication with the RTD 440. Other configurations of the manufacturing system are also useful.

The auto controller 410, in one embodiment, facilitates pre-emptive dispatch. In one embodiment, the auto controller receives real time information regarding operating conditions in the production facility and initiates pro-active advance action based on it. In the presently described embodiment, the auto controller 410 interfaces with the MSP, MES and RTD in such a way as to obtain real time MSP, MES and RTD data for real time event tracking and execution. In an alternative embodiment of the manufacturing automation system, the auto controller 410 may also interface directly with the AMHS so as to obtain and/or communicate real time information directly to the AMHS. Other configurations of the auto controller and other components of the manufacturing system are also useful.

As shown, the auto controller 410 is in a one-way communication with the MSP 420 and two-way communication with the MES 430 and RTD 440. To detect an anticipated conversion of the first lot to a ready to unload state, real time information regarding the progress of the first lot are used. For example, the auto controller 410 may receive real time information on the progress of the first lot processing in an equipment either directly through the MSP 420 or via the MES which is updated by the MSP. The auto controller 410 is adapted to listen to the real time information on the lot and based on the real time information, issues a command to determine a next destination for the lot before it reaches a ready to unload state.

The auto controller 410 may also be adapted to provide other pre-emptive dispatch functions. The functions are illustrated in FIG. 5 which shows a simplified process flow 500 for pre-emptive dispatch in accordance with one embodiment of the invention. It should be appreciated that the particular sequence, arrangement and number of steps in the process flow 500 are not meant to imply a fixed order, sequence, quantity and/or timing to the steps and modifications may be made without departing from the general invention of pre-emptive dispatch.

The process commences at step 501 where assuming that the items in a first lot are processed sequentially, the auto controller is adapted to listen to any events of the remaining x wafers that equipment A has yet to complete processing. Information regarding the processing conditions of the first lot may be provided by the MSP of equipment A through the MES. The auto controller is adapted to detect an anticipated conversion of the first lot to a ready to unload state based on the events of the remaining x wafers that equipment A has yet to complete processing. For example, detection may be based on various criteria such as when the 4th last wafer in the first lot completes processing.

Upon detection of the anticipated conversion, the auto controller initiates the execution of steps 520 and 540 simultaneously before the first lot actually reaches a ready to unload state. In the present embodiment shown in FIG. 5, the execution of steps 520 to 526 and steps 540 to 548 take place in parallel. In another embodiment, the auto controller may be adapted to trigger the execution of steps 520 and 540 based on different events that are indicative of an anticipated conversion of lot A to a ready to unload state. For example, step 520 may be triggered based on the process completion of 4th last wafer in the first lot while step 540 may be triggered based on the process completion of 2nd last wafer in the first lot.

Step 520 is a WhereNext analysis to determine a next destination for the first lot. In one embodiment, the auto controller may obtain a list of available destinations for lot A from the RTD and determine the next destination based on it. In a preferred embodiment, the next destination is determined before the first lot has finished processing.

After the next destination has been decided, at step 522, the auto controller initiates an action for a carrier transport to pick up the first lot from equipment A. In one embodiment, the algorithm for the auto controller is set so that a carrier transport for picking up lot A is sent to pickup lot A prior to the first lot reaching the ready to unload state. Preferably, the carrier transport is placed in the vicinity of the equipment prior to the ready to unload state.

At step 524, the auto controller listens to information on the status of the first lot through the MES and is adapted to proceed to step 526 when the auto controller detects that the first lot has reached the ready to unload state. At step 526, the auto controller instructs the carrier transport to pick up the first lot from equipment A.

Returning to step 501, the auto controller also triggers a WhatNext analysis at Step 540 upon detecting an anticipated conversion of lot A to a ready to unload state. The WhatNext analysis is to determine a next available lot to be processed in equipment A. In one embodiment, the auto controller may obtain information on the available work in progress (WIP) for equipment A from the RTD and determine the next lot to be processed in equipment A based on it. In a preferred embodiment, the next lot to be processed in equipment A is determined before the first lot has finished processing.

After the next lot to be processed has been decided, at step 542, the auto controller initiates an action for a carrier transport to pick up the next lot from its original location and deliver it to equipment A. In one embodiment, the algorithm for the auto controller is set so that a carrier transport is dispatched in time to have the next lot moving to equipment A before the first lot reaches a ready to unload state. Preferably, the carrier transport is placed in the vicinity of the equipment before the unloading of the first lot is completed.

At step 544, the auto controller listens to information on the status of equipment A through the MES and is adapted to proceed to step 546 when the auto controller detects that equipment A is ready to load the next lot for processing. At step 546, the auto controller initiates a process to reserve the next lot for processing on equipment A. In one embodiment, the auto controller performs lot reservation through MES.

At step 548, if the lot reservation in step 546 is successful, the auto controller instructs the AMHS through the MES to deliver the reserved lot to equipment A, loading the reserved lot onto equipment A for processing.

Figure 5A:
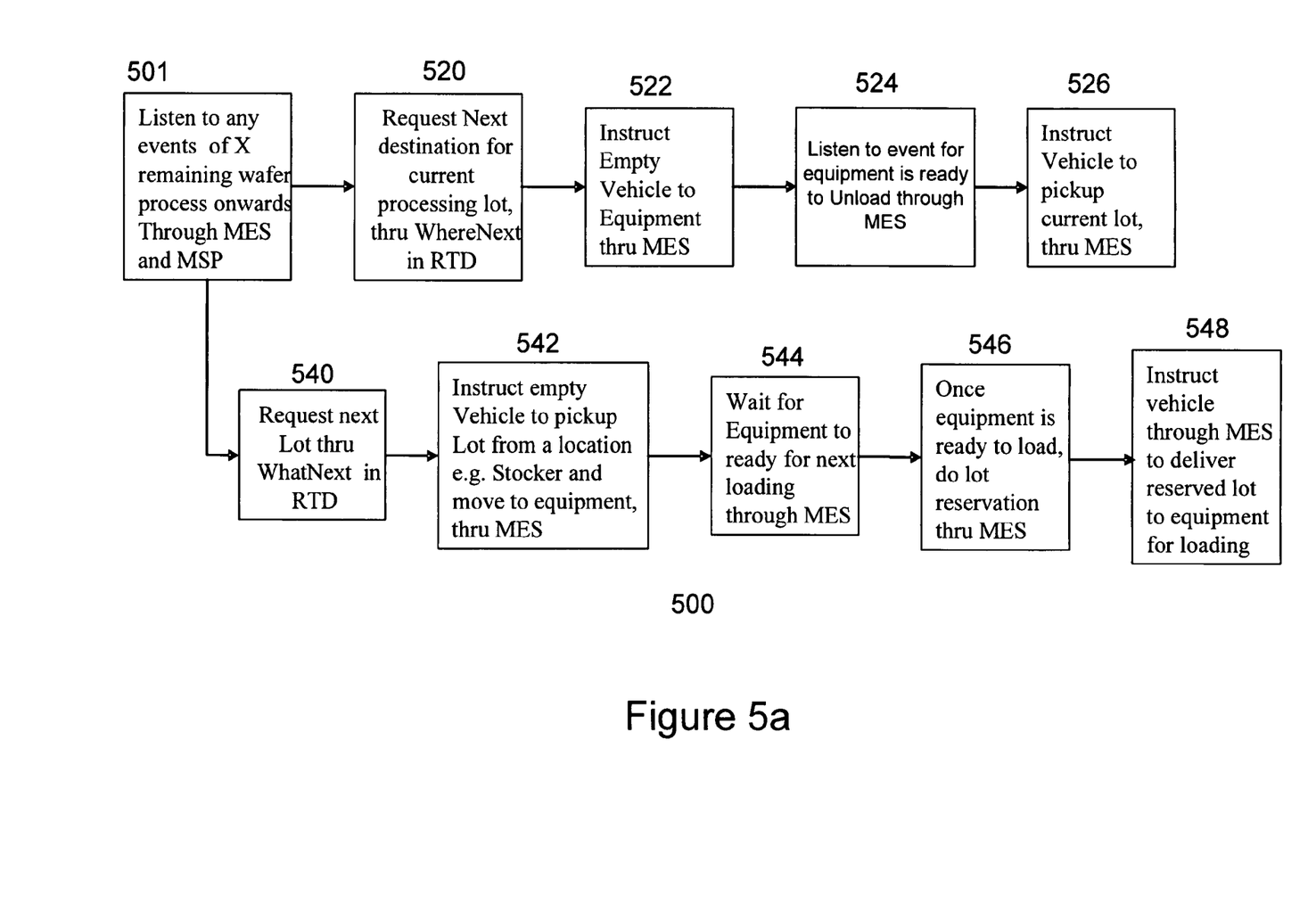
FIG. 5a shows a simplified work flow of an auto controller adapted to facilitate pre-emptive dispatch in accordance with a third embodiment of the invention.

In some embodiments, the auto controller workflow in FIG. 5a is timed so that the process to determine WhereNext 520 and WhatNext 540 is carried out concurrently. Preferably, the process to determine the next destination for the first lot and the identity of the next lot to be processed on equipment A is completed before lot A actually converts to a ready to unload state. The steps in the workflow of FIG. 5a may also be timed to facilitate the positioning of a pickup carrier transport in the vicinity of equipment A and a delivery carrier transport to be enroute to equipment A before the first lot is actually converted to a ready to unload state.

Figure 5B:
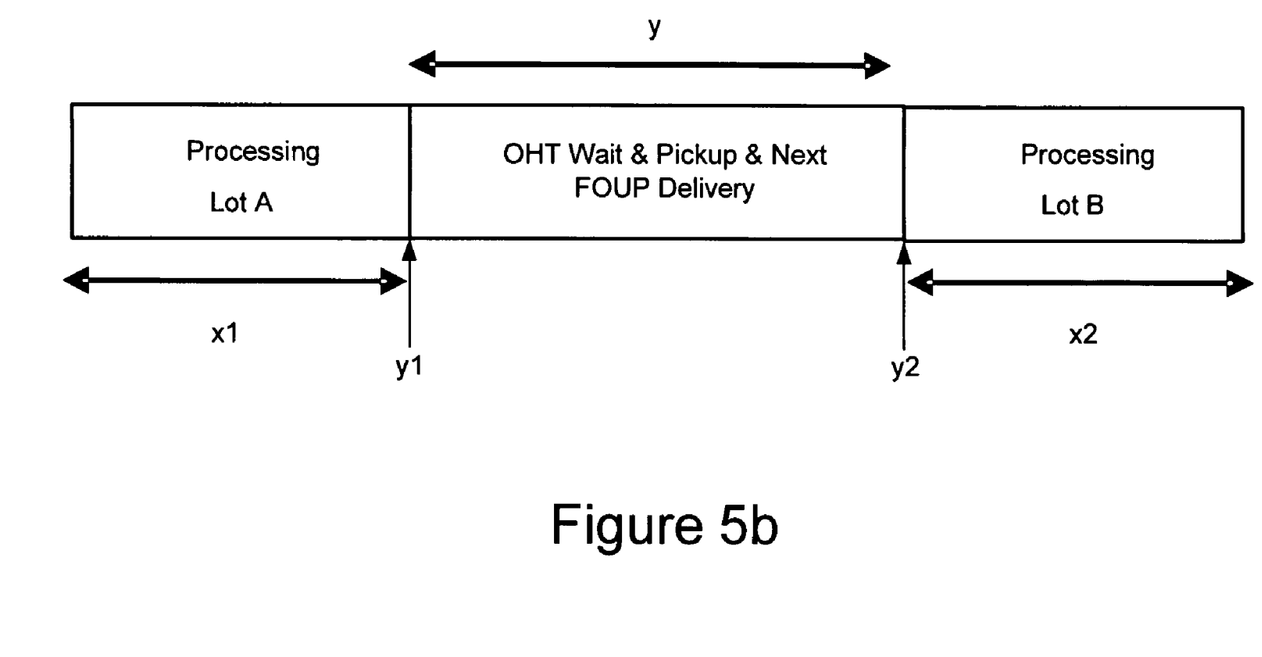
FIG. 5b shows a Gantt chart illustrating a process flow for pre-emptive dispatch in accordance with a fourth embodiment of the invention.

FIG. 5b shows a Gantt chart illustrating a process flow for pre-emptive material dispatch by a manufacturing automation system from a machine perspective in accordance with one embodiment of the present invention. x1 in the process flow represents a duration when equipment A is processing lot A. At the end of x1 as signified by y1 in FIG. 5b, lot A has completed processing and is in a ready to unload status when it is ready to be removed from the equipment A. x2 represents a duration when the equipment A is processing a second subsequent lot, lot B after lot A has been completed processing and is removed from the equipment A. The start of x2 is signified by y2 where loading of lot B onto the first tool for processing has completed. The time, y, elapsed between y1 and y2 is equivalent to the machine idle time.

By employing pre-emptive dispatch, the idle time y can be reduced. For example, the idle time only includes OHT unload and load, that is the unloading of the completed lot A from equipment A and the loading of lot B onto equipment A for processing. The time associated with WhereNext and WhatNext analyses, as present in FIG. 3, is avoided. This is because the WhereNext and WhatNext analyses and the requesting and movement of a pickup OHT to equipment A to retrieve lot A are completed before lot A actually converts to a ready to unload state. A delivery carrier transport containing lot B is also placed in the vicinity of equipment A before unloading of lot A from equipment A has completed so that lot B is available at equipment A for loading when equipment A becomes available.

Figure 6:
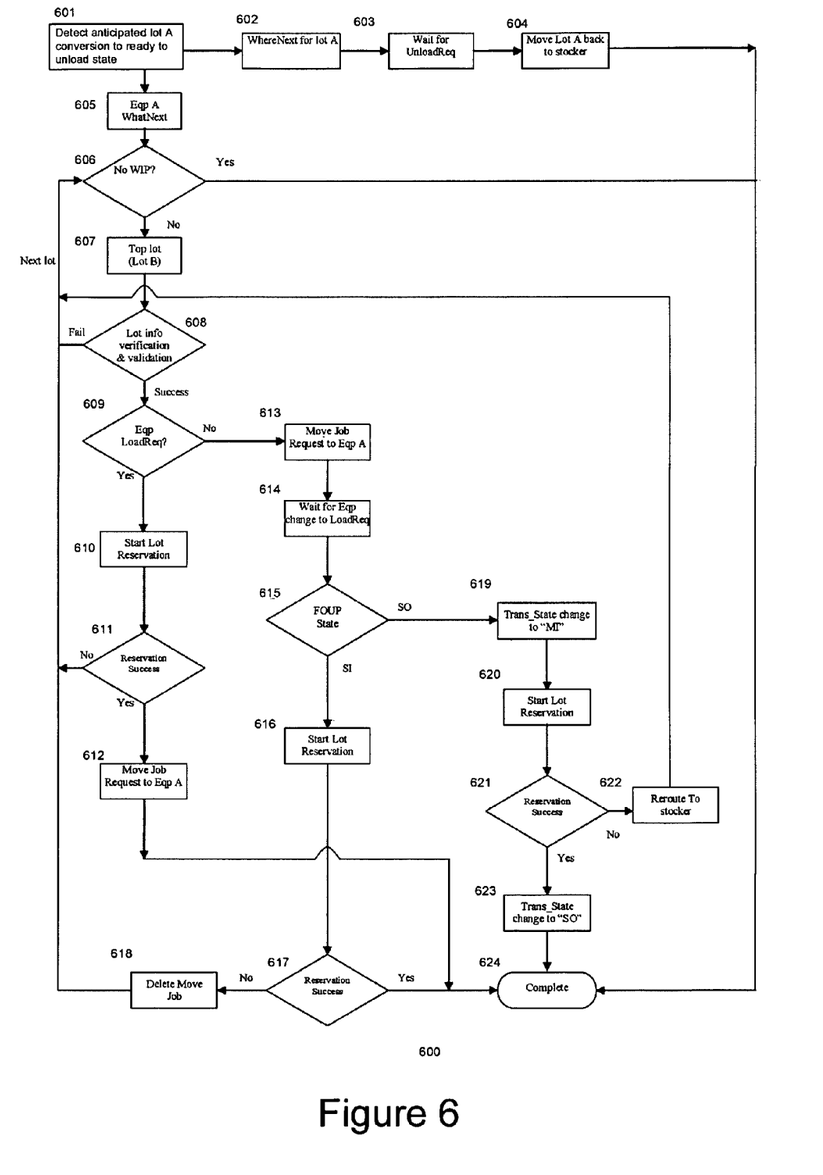
FIG. 6 shows flow chart illustrating an exemplary process steps for pre-emptive dispatch by the manufacturing automation system of FIG. 4 in accordance with a fifth embodiment of the invention.

FIG. 6 is a detailed pre-emptive dispatch flow chart illustrating an example process 600 for some embodiments of the present invention that may be performed using the manufacturing automation system 400 shown in FIG. 4. However, it should be appreciated that while the manufacturing automation system 400 is useful for performing methods of the invention, it is not necessary to have the exact same components and arrangement thereof in order to practice the invention. Additionally, it is to be understood that the particular number and order of steps in FIG. 6 are merely exemplary and not meant to imply a fixed order, sequence, quantity or timing to the steps. Embodiments of the invention can also be practiced while varying the order, sequence and/or timing of steps shown in FIG. 6. Also, not all the steps illustrated are necessary to perform the methods of the present invention.

Referring to FIG. 6, the process 600 commences in step 601 where the auto controller which has been monitoring the progress of lot A processing in equipment A, detects an anticipated conversion of lot A to a ready to unload state. The ready to unload state being indicative that lot A has completed processing and is ready to be removed from the equipment A. In the ready to unload state, the items of lot A would typically be loaded into a carrier and placed at a loading station of equipment A e.g. load port, ready to be unloaded. In one embodiment, the auto controller monitors the progress of lot A via a Manufacturing Execution System (MES) which is updated by an MSP associated with equipment A. In one embodiment, SiView which is available from IBM acts as an interface for a Manufacturing Execution System (MES) and commands are issued and data received via SiView. Other forms of MES interface e.g. PROMISE are also suitable. Alternatively, the auto controller may also monitor the progress of lot A directly through MSP, for example, by using a JMS (Java Message Services) connection.

The detection of an anticipated ready to unload state, in one embodiment, triggers the auto controller to execute two actions concurrently:
i. Step 602—initiate a "WhereNext" analysis to determine a next destination for lot A; and
ii. Step 605—initiate a "WhatNext" analysis to identify a second subsequent lot to process on equipment A.

The controller can be triggered to perform items i) and ii) anytime before lot A is in a ready to unload state. Additionally, items i) and ii) may also be triggered simultaneously or at different times. In the presently described embodiment, assuming that the items in a lot are processed sequentially, the auto controller listens to any events concerning the last X items to be processed in sequence. The auto controller may be set up to detect an anticipated conversion of lot A to a ready to unload state when the last wafer of lot A completes processing in a chamber and SiView publishes "Process End" event for lot A. The process end for other wafers in lot A may also be used as an indication of anticipated conversion to a ready to unload state. Alternatively, if the wafers in lot A are processed using different recipes, the auto controller may be triggered when the last wafer running recipe A has completed processing but wafers running recipe B has not finished processing.

In step 602, the auto controller initiates a WhereNext analysis to determine a next destination for lot A before lot A reaches the ready to unload state. In one embodiment, the auto controller requests a list of available destinations for lot A from the RTD and determines a next destination. The RTD manages the lots in a production facility, providing information such as lot priority and dispatching lot sequence. The available destination can be a stocker or an equipment. The auto controller may be programmed such that when selecting a next destination, an equipment destination takes priority over stocker destination. Useful factors used in determining available equipment destinations include, for example, equipment status availability, priority of lot A to be processed at the suitable equipments for next process. In one embodiment, the auto controller can be customized to shorten the time taken for the WhereNext and WhatNext analyses.

After the next destination for lot A is determined, which in the case of FIG. 6 is a stocker, the auto controller creates "Move lot A to stocker" move request in the SiView for Lot A to be delivered from equipment A load port to stocker. SiView then instructs the Automated Material Handling System (AMHS), which manages the transport system of the production facility to send a pickup carrier support to pick up lot A from equipment A. The creation of the "Move lot A to stocker" request in SiView may occur immediately or after a deliberate delay. A deliberate delay may be inserted for example, if the trigger event to execute actions i) and ii) in Step 601 occurs before processing of the last item in lot A is completed.

In step 603, the auto controller waits for lot A to change to the ready to unload state where an Unload Request can be issued by for example the MSP of equipment A.

In step 604, upon receiving the unload request, lot A will be picked up from equipment A and placed in the pickup carrier transport where it is transferred to the stocker identified in step 602. After this, the process 600 ends in step 624. In one embodiment, the carrier transports may have a transfer robot attached to it, the transfer robot adapted to transfer lots between a processing equipment and the carrier transport. Alternatively, each processing equipment may also have a carrier handler for transferring lots between a processing equipment and the carrier transport. Other forms of transfer mechanism are also suitable for transferring a lot between a carrier transport and equipment.

As mentioned earlier, the detection of an anticipated ready to unload state in step 601 triggers the auto controller to concurrently initiate a command to identify a second subsequent lot for processing on equipment A. Therefore, in step 605, the auto controller requests the RTD for a "WhatNext" lot list for equipment A. The "WhatNext" lot list is a list of lots equipment A can process in order of priority. The delegation of lot priority in the lot list may be based on RTD rule settings such as lot type, completion date and type of recipe to be used for processing.

At step 606, the auto controller checks the lot list obtained from the RTD in step 605 to determine if there is Work In Progress (WIP) available for equipment A. If there is no WIP, then the process 600 ends in step 624, if there is WIP, goes to step 607.

At step 607, the top lot in the lot list for equipment A is selected. The top lot in this case has the highest priority in the lot list.

At step 608, the auto controller conducts a lot information verification and validation process for the lot selected in step 607. In one embodiment, lot information verification and validation process comprises checking for conflicts between the lot information provided by the RTD from the "What Next" analysis in step 605 and lot information contained in SiView. Lot information being verified and validated may include number of items in a lot, recipe to be used by equipment A for processing a lot and the location of items in a lot within a carrier containing it. If the lot information verification and validation process is successful, the process 600 proceeds to step 609.

If the lot information verification and validation process is not successful, the auto controller returns to step 606 to check if there is any more Work In Progress (WIP) available for equipment A, selecting the next top lot or the lot with the next highest priority in the lot list obtained in step 605 for lot information verification and validation. Steps 606 to 608 are repeated until all the available WIP for equipment A have been queried. In the event that no lots in the lot list for equipment A can be successfully verified and validated, the process 600 ends in step 624.

Once the lot has been successfully verified and validated, the auto controller checks to see if equipment A is ready to receive a subsequent lot for processing in step 609. For example, whether the carrier containing lot A has been removed from the load port of equipment A. In the present embodiment, if equipment A is ready to receive a subsequent lot, the load port status of equipment A will be "LoadReq". If equipment A is ready to receive a subsequent lot that is, the load port status is "LoadReq" then go to step 610, else go to step 613.

At step 610, the auto controller initiates a lot reservation process to reserve the lot that has been successfully verified and validated in step 608. In one embodiment, the auto controller reserves a lot by invoking control job creation request (TxStartLotReservationReq) to SiView.

At step 611, the auto controller determines if the lot reservation in step 610 is successful. If the lot reservation is successful (e.g. someone else has not reserved the lot or put it on hold so that further processing is temporarily suspended), the process proceeds to step 612. If the lot reservation is not successful, the process returns to step 606 to check if there is any more WIP available for equipment A. If there is no WIP, then the process 600 ends in step 624. If there is WIP, then the process repeats steps 607 to 611 until a lot is successfully reserved.

After the lot has been successfully reserved, the auto controller issues a transportation request for a carrier transport to retrieve the lot to be processed, lot B and move it to equipment A. In this example, the auto controller invokes a move job request (TxSingleCarrierXfrReq or TxMultiCarrierXfrReq) to SiView to instruct the AMHS to move lot B to equipment A. When lot B is delivered to equipment A by the carrier transport, it is loaded onto equipment A for processing and the process 600 ends in step 624.

If the auto controller determines at step 609 that equipment A is not ready to receive the next lot, i.e. status not equal to LoadReq, the auto controller issues a transportation request for a delivery carrier transport to retrieve the lot that has been successfully verified and validated in step 608 and move it to equipment A. In this example, the auto controller causes a move request (TxSingleCarrierXfrReq or TxMultiCarrierXfrReq) to be invoked in SiView at step 613 to instruct the AMHS to move the lot to be processed to equipment A.

At step 614, the auto controller waits for equipment A to be ready to receive a subsequent lot for processing. For example, the carrier containing lot A has been removed from the load port of equipment A. In the present embodiment, if equipment A is ready to receive a subsequent lot, the load port status of equipment A will be changed to "LoadReq".

At step 615, when the load port status of equipment A changes to "LoadReq", the auto controller checks the current location of the lot to be processed, has it been picked up by the carrier transport from its original location e.g. stocker or equipment for delivery to equipment A. In the present embodiment, the status of a lot's current location is reflected by the location of its carrier which is a sealed pod in the form of a Front Opening Unified Pod (FOUP). The auto controller checks the FOUP state on SiView.

For purposes of simplification, we will assume in the present embodiment that the lot to be processed is originally located at the stocker.

IF FOUP status is "SI", this means that the lot to be processed is still at the stocker and has not been picked up by the delivery carrier transport. When this happens, the process 600 goes to step 616;

IF FOUP status is "SO", this means that the delivery carrier transport has already picked up the lot to be processed from the stocker. When this happens, the process 600 goes to step 619.

It is to be appreciated that the present invention is not only practicable when the lot to be processed is originally located at a stocker. It may also be originally located at an equipment where the status of the FOUP would then be "EI" and "EO" meaning that the lot is at the equipment or already picked up from the equipment respectively.

At step 616, the auto controller initiates a "Start Lot Reservation" process to reserve the lot to be processed. In one embodiment, the auto controller reserves a lot by invoking control job creation request (TxStartLotReservationReq) to SiView. If the auto controller determines at step 617 that the Start Lot Reservation is successful, then the process 600 completes at step 624.

If the Start Lot Reservation is not successful then at step 618 cancels the transport request to move the lot from the stocker to equipment A. The process flow then returns back to step 606 to determine if there is any more WIP available for equipment A. In this example, the auto controller issues a Delete Move Job command to SiView (TxLotCassetteXferJobDeleteReq) instructing SiView to cancel the request to the AMHS for movement of the lot from the stocker to equipment A.

Returning to step 615, if the FOUP state is "SO", that is the lot has been retrieved from the stocker and is in transit in the delivery carrier transport. The present invention allows for the reservation of a lot when it is in a delivery carrier transport. To allow for the reservation of the lot, the auto controller causes the FOUP state to change to one that allows for lot reservation. In this example, the auto controller issues a Trans State Change Request to change the FOUP state to "MI" in SiView. "MI" stands for manual in. The reason for the change in state is typically according to SEMI standard, lot reservation process cannot be initiated for a lot which is in a carrier transport.

At step 620 the auto controller initiates a "Start Lot Reservation" process to reserve the lot to be processed. In one embodiment, the auto controller reserves a lot by invoking control job creation request (TxStartLotReservationReq) to SiView. If the auto controller determines at step 621 that the Start Lot Reservation is not successful, then the process 600 proceeds to step 622. If the Start Lot Reservation is successful then the process 600 proceeds to step 623.

At step 622, the auto controller initiates a transportation request to reroute the lot that was not successfully reserved at step 621 back to a stocker. In one embodiment, the auto controller issues a move request (TxSingleCarrierXfrReq or TxMultiCarrierXfrReq) to SiView to instruct the AMHS to reroute the lot to go back to the stocker. After step 622 is completed, the process 600 loops back to step 606 to check if there is any more WIP available for equipment A.

At step 623, the auto controller issues a Change State Change Request to change the FOUP status of the lot that has been successfully reserved at step 621 back to the original status which is "SO" in this example.

At step 624, the exemplary process 600 for pre-emptive dispatch is completed.

Figure 7:
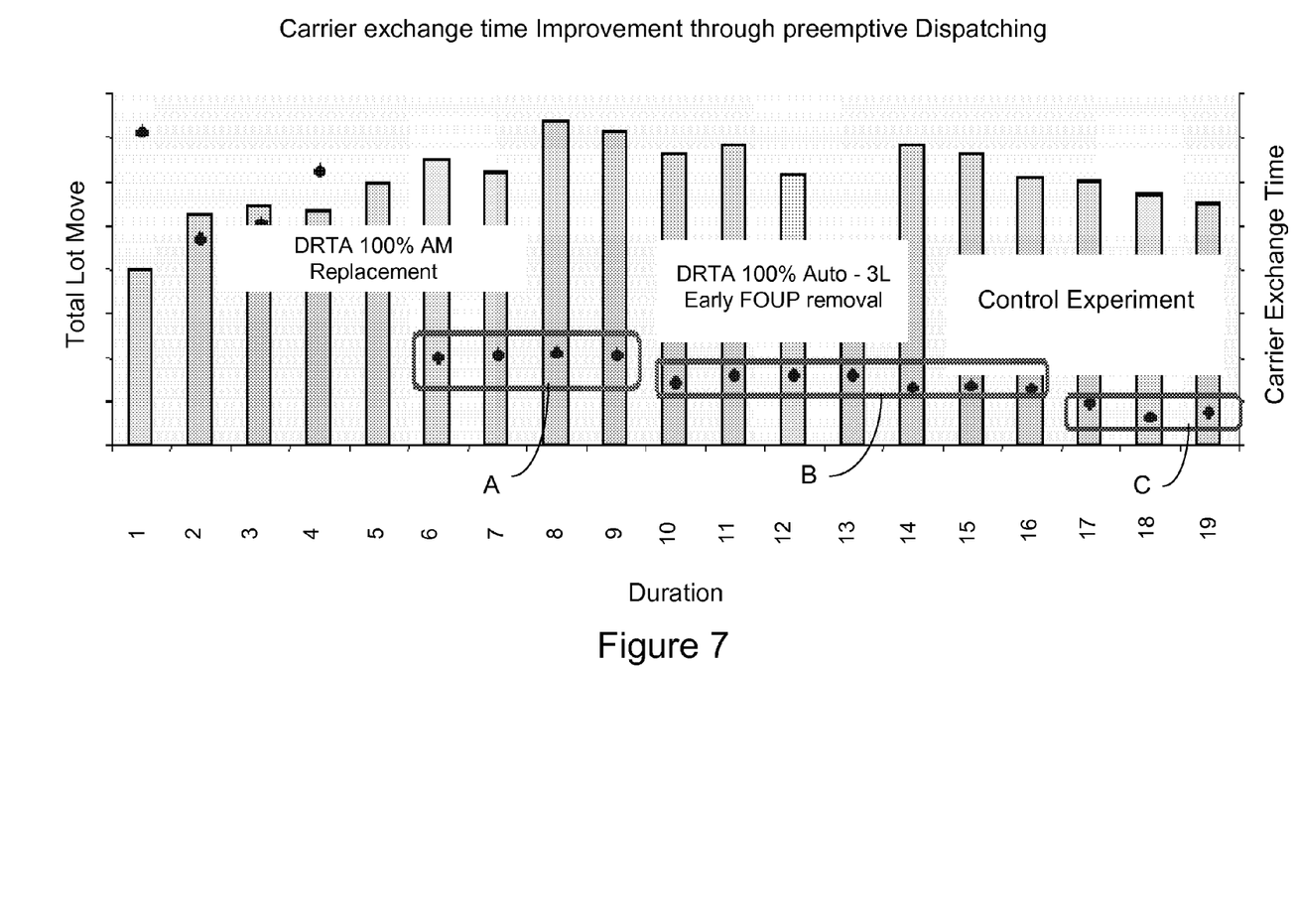
FIG. 7 is a graph illustrating the correlation between carrier exchange time versus dispatching method used by a manufacturing automation system.

In accordance with one aspect of the invention, the parameters may be used to compare the performance of different dispatch methods. They are carrier exchange time Vs Move. Carrier exchange time refers to the idle time of an equipment. That is, the time between a completed lot converting to a ready to unload status to the successful loading of a subsequent lot onto the equipment for processing. FIG. 7 shows the variation in carrier exchange time for different dispatching methods. The data collected is summarized in terms of weeks. In duration A between weeks 6 to 9, the dispatch method of FIG. 3 without pre-emptive dispatch is implemented using event triggering. In duration B between weeks 10 to 16, a pre-emptive event based on dispatch method is implemented with the steps in FIG. 5a and WhereNext analysis initiated before the first lot is in a ready to unload state. However, instead of executing steps 520-526 in parallel with steps 540-548 like in FIG. 5a, steps 540-548 are only executed after step 526 has been completed. In duration C between weeks 17 to 19, the pre-emptive event based on dispatch method shown in FIG. 5a is implemented where steps 520-526 and steps 540-548 are executed in parallel.

As shown in FIG. 7, there is a reduction in carrier exchange time for durations B and C where pre-emptive dispatch is implemented compared to duration A where there is no pre-emptive dispatch. Additionally, the parallel execution of steps 520-526 and steps 540-548 in duration C also brings about a reduction in carrier exchange time of more than 40% as compared to sequential execution of steps 520-526 and steps 540-548 in duration B. Therefore, pre-emptive dispatch can advantageously reduce the carrier exchange time or machine idle time in a production facility.

The preferred embodiment of the invention is illustrative of the invention rather than limiting of the invention. It is to be understood that revisions and modifications may be made to methods and systems described herein while still providing a manufacturing automation system and an automated method for movement of material that fall within the scope of the included claims. All matters hitherto set forth herein or shown in the accompanying figures are to be interpreted in an illustrative and non limiting sense.

What is claimed is:

1. An automated method for movement of material in a production facility comprising:

detecting an anticipated conversion in status of a first lot processing in a first equipment to a ready to unload state, wherein the ready to unload state indicates that the first lot has completed processing and is ready to be unloaded from the first equipment;

issuing a next destination command to determine a next processing tool for the first lot before the first lot is converted to the ready to unload state, wherein determining the next processing tool for the first lot comprises
performing a next destination analysis to select the next processing tool that is available for processing the first lot for subsequent processing, and
performing a priority analysis of the first lot to be processed at the next processing tool; and dispatching a pickup transport to pick up the first lot from the first equipment before the first lot is converted to the ready to unload state.

2. The method of claim 1, further comprising selecting the next processing tool for the first lot before the first lot is converted to the ready to unload state.

3. The method of claim 2, wherein the pickup transport is parked within a proximate domain of the first equipment before the first lot is converted to the ready to unload state.

4. The method of claim 1, wherein determining a next processing tool for the first lot comprises checking at least one of a next equipment availability and priority of the first lot with respect to the next equipment.

5. The method of claim 1, further comprising issuing a next lot command to determine a second subsequent lot to be processed in the first equipment before the first lot is unloaded from the first equipment.

6. The method of claim 5, wherein the next lot command is issued before the first lot is converted to the ready to unload state.

7. The method of claim 6, further comprising selecting the second lot to be processed on the first equipment before the first lot is converted to the ready to unload state.

8. The method of claim 7, further comprising issuing a delivery transport request to dispatch a delivery transport for retrieving the second lot from an original location and transporting the second lot to the first equipment, wherein the delivery transport request issued before the first lot is converted to the ready to unload state.

9. The method of claim 8, further comprising dispatching a delivery transport to pick up the second lot from the original location for transportation to the first equipment before the first lot is unloaded from the first equipment.

10. The method of claim 9, wherein the delivery transport has picked up the second lot from the original location before the first lot is unloaded from the first equipment.

11. The method of claim 10, wherein the delivery transport is parked within the proximate domain of the first equipment before the first lot is unloaded from the first equipment.

12. The method of claim 9, further comprising reserving the second lot after the second lot has been picked up by the delivery transport from the original location.

13. The method according to claim 5 wherein the next destination and next lot commands are issued simultaneously.

14. The method of claim 13, further comprising executing the next destination and next lot commands in parallel.

15. An automated method for movement of material in a production facility comprising:

detecting an anticipated conversion in status of a first lot processing in a first equipment to a ready to unload state, wherein the ready to unload state indicates that the first lot has completed processing and is ready to be unloaded from the first equipment; and performing the following actions before the first lot is converted to the ready to unload state:
issuing a next destination command to determine a next processing tool for the first lot, wherein determining the next processing tool for the first lot comprises
performing a next destination analysis to select the next processing tool that is available for processing the first lot for subsequent processing, and
performing a priority analysis of the first lot to be processed at the next processing tool;
selecting the next processing tool for the first lot and dispatching a pickup transport to pick up the first lot from the first equipment,
issuing a next lot command to determine a second subsequent lot to be processed in the first equipment, and
selecting the second lot to be processed in the first equipment and dispatching a delivery transport for retrieving the second lot from an original location and transporting the second lot to the first equipment.

16. The method of claim 15, wherein
the pickup transport is parked within a proximate domain of the first equipment before the first lot is converted to the ready to unload state; and
the delivery transport is parked within a proximate domain of the first equipment before the first lot is unloaded from the first equipment.

17. A computer medium for storing a computer program for manufacturing automation comprising:

detecting an anticipated conversion in status of a first lot processing in a first equipment to a ready to unload state, wherein the ready to unload state indicates that the first lot has completed processing and is ready to be unloaded from the first equipment; and issuing a next destination command to determine a next processing tool for the first lot before the first lot is converted to the ready to unload state, wherein determining the next processing tool for the first lot comprises
performing a next destination analysis to select the next processing tool that is available for processing the first lot for subsequent processing, and
performing a priority analysis of the first lot to be processed at the next processing tool; and dispatching a pickup transport to pick up the first lot from the first equipment before the first lot is converted to the ready to unload state.

18. A method of manufacturing articles comprising:
processing a first article in a first tool;
detecting an anticipated conversion in status of the first article to a ready to unload state; and
issuing a next destination command to determine the next processing tool for the first article before the first article is converted to the ready to unload state, wherein determining the next processing tool for the first lot comprises
performing a next destination analysis to select the next processing tool that is available for processing the first lot for subsequent processing, and
performing a priority analysis of the first lot to be processed at the next processing tool; and
dispatching a pickup transport to pick up the first lot from the first tool before the first lot is converted to the ready to unload state.

19. The method in claim 18 wherein the first article comprises a first lot of semiconductor wafers on which integrated circuits are formed.

20. The method in claim 18 comprising selecting the next processing tool for the first article before the first article is converted to the ready to unload state.

21. The method in claim 20 wherein the pickup transport is parked within a proximate domain of the first tool before the first article is converted to the ready to unload state.

22. The method in claim 18 wherein determining a next processing tool for the first article comprises checking at least one of a next equipment availability and priority of the first article with respect to the next equipment.

23. The method in claim 18 comprising issuing a next article command to determine a second subsequent article to be processed in the first tool before the first article is unloaded from the first tool.

24. The method in claim 23 wherein the next article command is issued before the first article is converted to the ready to unload state.

25. The method in claim 24 comprising selecting the second article to be processed on the first tool before the first article is converted to the ready to unload state.

26. The method in claim 25 comprising issuing a delivery transport request to dispatch a delivery transport for retrieving the second article from an original location and transporting the second article to the first tool, wherein the delivery transport request issued before the first article is converted to the ready to unload state.

27. The method in claim 26 comprising dispatching a delivery transport to pick up the second article from the original location for transportation to the first tool before the first article is unloaded form the first tool.

28. The method in claim 27 wherein the delivery transport has picked up the second article from the original location before the first article is unloaded from the first tool.

29. The method in claim 28 wherein the delivery transport is parked within the proximate domain of the first tool before the first article is unloaded from the first tool.

30. The method in claim 27 comprising reserving the second article after the second article has been picked up by the delivery transport from the original location.

31. The method in claim 23 wherein the next destination and next article commands are issued simultaneously.

32. The method in claim 31 comprising executing the next destination and next article commands in parallel.

* * * * *